March 27, 1934.  C. DESLATTES  1,952,792
LAWN MOWER ATTACHMENT
Filed Jan. 31, 1933  2 Sheets-Sheet 1

Inventor
C. Deslattes
By Wilkinson & Mawhinney
Attorneys.

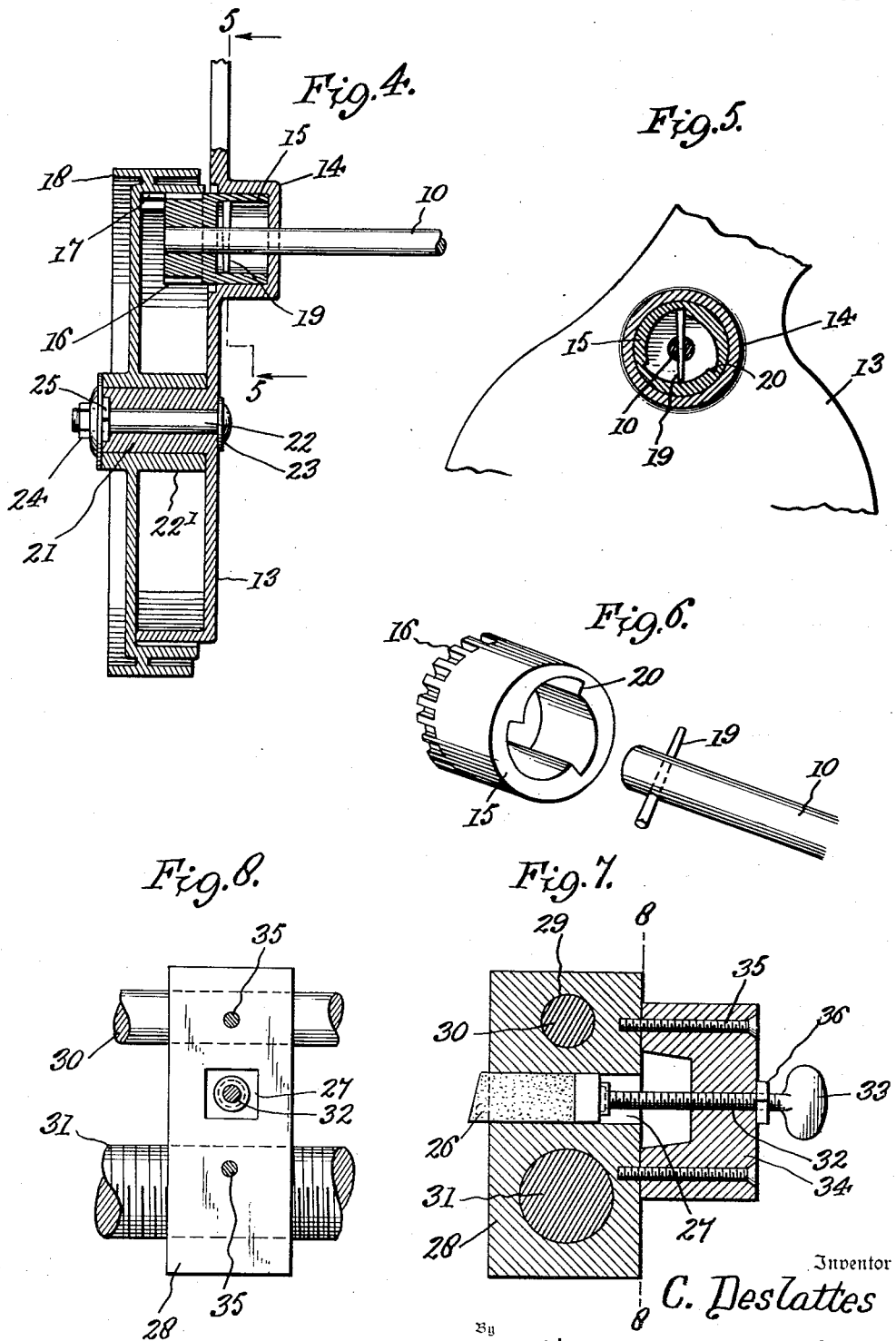

UNITED STATES PATENT OFFICE 1,952,792

LAWN MOWER ATTACHMENT

Clifton Deslattes, New Orleans, La., assignor of one-third to Marie Dargis, New Orleans, La.

Application January 31, 1933, Serial No. 654,505

2 Claims. (Cl. 51—246)

The present invention relates to improvements in lawn mower attachments and has for an object to provide a sharpening device for the knives or blades of the lawn mower.

An object of the invention is to provide an improved device attachable to the lawn mower and in operative relation to the knives or blades during the movement of the lawn mower whereby to sharpen such knives or blades in an expeditious and improved manner.

A further object of the invention is to provide an improved device of simple and inexpensive form which will sharpen the blades rapidly upon forward and reverse manipulation of the lawn mower through a limited movement.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary plan view, with parts broken away and parts shown in section, of a lawn mower equipped with my improved attachment.

Figure 4 is a section taken along the line 4—4 in Figure 3.

Figure 5 is a section taken on the line 5—5 in Figure 4.

Figure 6 is a fragmentary perspective view of the pinion and cutter shaft with the parts disassembled.

Figure 7 is a sectional view taken through the cutter block and associated shafts, and Figure 8 is a section taken on the line 8—8 in Figure 7.

Figure 1:
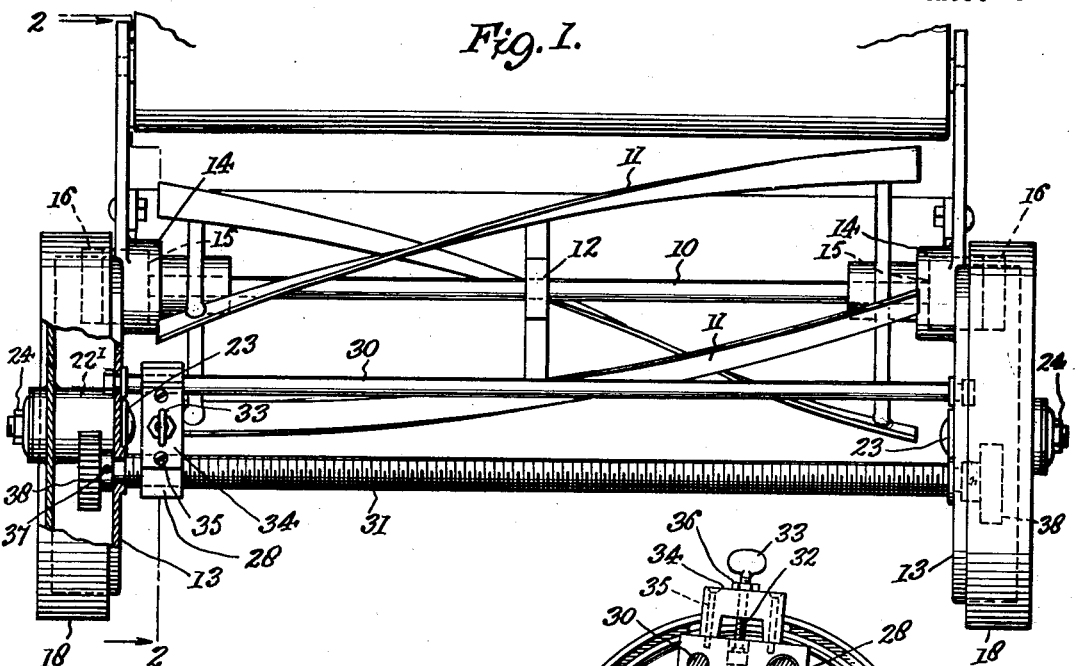
Figure 2:
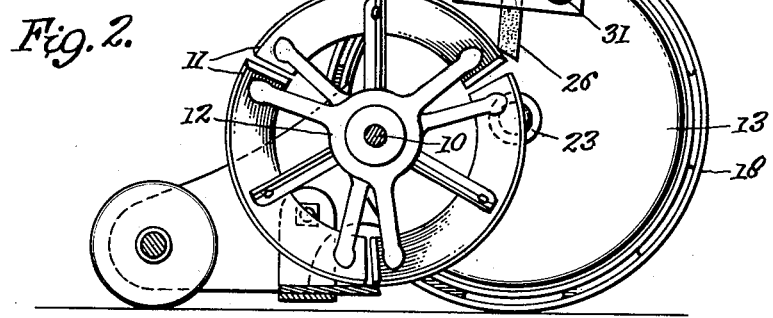
Figure 2 is a section taken along the line 2—2 in Figure 1.

Referring more particularly to the drawings, 10 designates the cutter shaft of a lawn mower having the usual cutter bars or knives 11 which extend spirally about the same and are held thereto as by the arms 12.

The cutter shaft 10 is journalled through plates 13 having inward offsets 14, more particularly shown in Figure 4, to rotatably receive the smooth portions of the pinions 15 having the teeth 16 to mesh with the internal gears 17 upon the ground wheels 18. The pinions 15 are loosely received over the ends of the shaft 10, and cross pins 19 extending through the ends of the shaft 10 are adapted to cooperate with ratchet teeth 20 upon the inside of the pinion 15. This is a usual form of construction, from which I have departed only in that the pins 19 are made longer than the ordinary pins now used for this purpose. In other words, such pins 19 are approximately one-quarter inch longer than the conventional pins in order that such pins 19 may extend the full internal diameter of the pinions 15. This condition is shown in Figure 5 where the pin 19 is shown as jammed in the pinion, causing the shaft 10 to rotate with the pinion 15 in both forward and reverse directions. With the shorter pin ordinarily in use, the cutter shaft 10 will be rotated only in the forward movement of the lawn mower but will be disconnected, due to the ratchet arrangement, on the rear movement of such lawn mower.

As shown in Figure 4, the plate 13 has a hub 21 on which the hub 22' of the ground wheel 18 is slidably fitted. A bolt or shaft 22 extends through the hub 21 and has an enlarged head 23 at its inner side. At the outer side the bolt 22 is provided with a nut 24 and an enlarged washer 25 for holding the hub 22' in place.

In Figures 7 and 8, I have shown a carborundum or other sharpening stone 26 mounted slidably in an opening 27 in a guide block 28. This guide block is provided with an opening 29 which is smooth to slide upon the tie rod 30 forming a part of the conventional lawn mower. This rod 30 forms a guide for the block 28. The block 28 at its other side is formed with a threaded opening corresponding to the threads on the feed shaft 31. This feed shaft is in addition to the ordinary parts of the lown mower. It extends substantially parallel with the cutter shaft 10 and the tie rod 30 and is in spaced relation to the tie rod 30 and in rather close proximity thereto so as to bring the stone 26 into a correct relation with respect to the edges of the knives 11. The stone 26 is mounted for adjustment on the end of a screw threaded adjusting rod 32 having a thumb piece 33 on its exterior for the purpose of adjusting the stone 26 in use. The adjusting screw 32 is threaded through a saddle 34 fitted against the outer side of the block 28 and removably secured thereto as by the screws or other fastenings 35. A lock nut 36 on the screw rod 32 is adapted to hold the stone in adjusted position.

Figure 3:
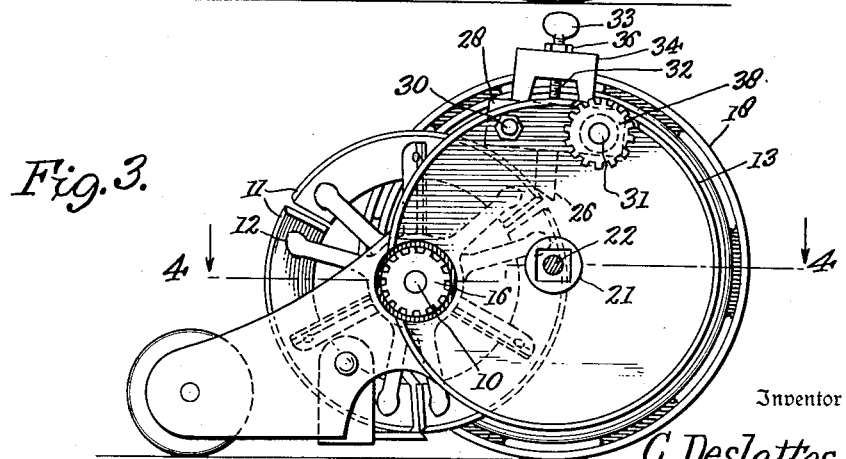
Figure 3 is an end view with one of the ground wheels removed.

The feed shaft 31 is journaled through the plates 13. Outwardly of such plates the feed screw 31 receives pinions 38 held removably to the projecting ends of the shaft as by the use of pins or set screws 37. These pinions 38 are so arranged as to be in mesh with the internal gears 17 on the ground wheels 18. This position is shown in Figure 3.

In the use of the device, the block 28 travels back and forth on the feed screw 31 being guided by the tie rod 30. The feed screw 31 receives its movement when the lawn mower is pushed over the ground by virtue of the movement communicated to the pinions 37 by the internal gears 17 of the ground wheels 18. On the forward movement of the lawn mower, the feed screw 31 will be rotated in one direction causing the traversing of the sharpening block 28 in one direction. When the lawn mower is pulled back or reversed in movement, the knives 11 will be required to rotate in a reverse direction due to the elongated pins 19 in the ratchets, and the sharpening block 28 will be fed back along the screw 31 in the opposite direction. The knives 11 will be rapidly rotated past the stone 26 in one direction on one traverse of the block 28, and in the opposite direction on the reverse traverse. The sharpening stone 26 will progress slowly along the feed screw and along the knives 11 while the same are rapidly rotated past and against said stone whereby a rapid sharpening, efficiently performed, is secured.

After the sharpening operation is completed, the nuts 24 are removed to permit the ground wheels to be slid off their mountings and to give access to the pinions 15 and 38. The pinions 15 are removed, the pins 19 withdrawn and the customary shorter pins inserted; whereupon the pinions 15 are restored to place, as shown in Figure 4, so that when the lawn mower is again operated for cutting grass, the mower knives 11 will be driven only on the forward movement of the machine and not on the backward movement thereof.

Also when the ground wheels are removed, the pinions 38 may be disconnected from the screw feed shaft 31 thus rendering this shaft inoperative. The carborundum stone 26 may be withdrawn within its block 28 by backing off the screw 32. The reverse process is gone through with whenever the lawn mower is to be sharpened.

It will be obvious that various changes in the construction, combination and arrangement of parts could be made, which could be used without departing from the spirit of my invention, and I do not mean to limit the invention to such details except as particularly pointed out in the claims.

Having thus described my invention, what I claim and desire to secure by Letters Patent of the United States is:—

1. In a lawn mower, rotary mower knives, a tie rod, a screw feed shaft, a block threaded for movement on said feed shaft and guided by said tie rod, said block having an opening therethrough, a saddle removably attached to the outer side of said block and having a threaded opening therethrough, a screw adjusting rod threaded in the opening in the said saddle and having external means for manipulating the same, lock means for holding said adjusting rod in adjusted position, and a carborundum stone carried by said threaded rod and movably mounted through the opening in said block for engagement with the edges of the mower knives.

2. In a lawn mower, ground wheels having internal racks, a cutter shaft, blades mounted on said shaft, a screw feed shaft, pinions on each of said shafts, and meshing with the internal racks of the ground wheels for rotating each of said shafts in opposite directions depending upon the direction of rotation of said ground wheels, and sharpening means reciprocated across the lawn mower in operative relation with said blades by said screw feed shaft.

CLIFTON DESLATTES.